March 1, 1960  G. E. HOOK ET AL  2,926,529
PROPELLER BLADE DYNAMIC BALANCE TESTING MACHINE
Filed Oct. 24, 1956  3 Sheets-Sheet 1

INVENTORS
GERALD E. HOOK
ELTON K. MORICE
BY
D. C. Staley
THEIR ATTORNEY

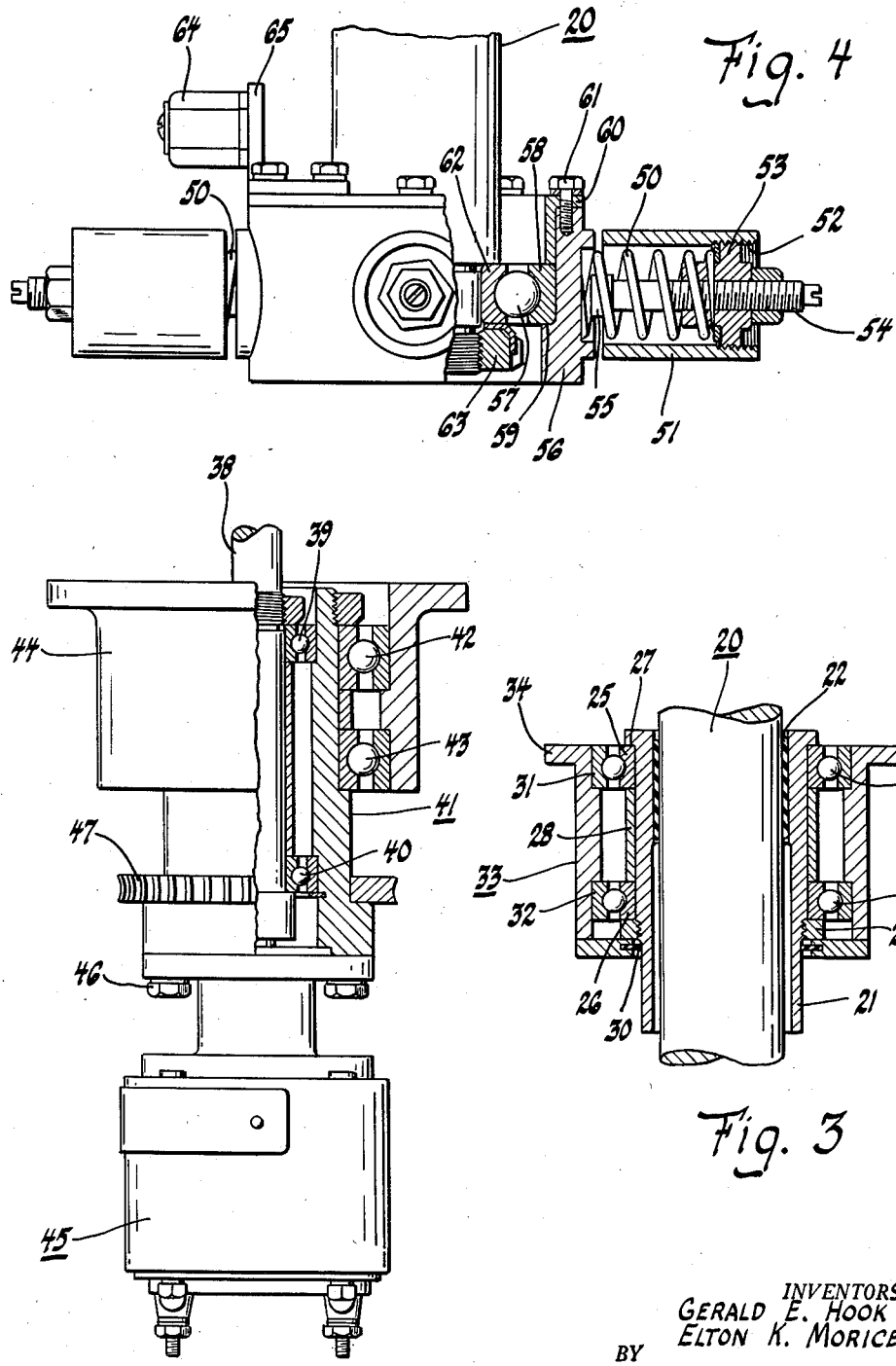

March 1, 1960 G. E. HOOK ET AL 2,926,529
PROPELLER BLADE DYNAMIC BALANCE TESTING MACHINE
Filed Oct. 24, 1956 3 Sheets-Sheet 3

TACHOMETER GENERATOR VOLTAGE

OSCILLOSCOPE

VIBRATION PICKUP SIGNAL

INVENTORS
GERALD E. HOOK
ELTON K. MORICE
BY
D. C. Staley
THEIR ATTORNEY ent Office 2,926,529
Patented Mar. 1, 1960

2,926,529

PROPELLER BLADE DYNAMIC BALANCE TESTING MACHINE

Gerald E. Hook, Fairfax, Va., and Elton K. Morice, Dayton, Ohio, assignors to General Motors Corporation, Detroit, Mich., a corporation of Delaware Application October 24, 1956, Serial No. 618,034

5 Claims. (Cl. 73—456)

This invention pertains to dynamic balance testing apparatus, and particularly to apparatus for determining the direction and magnitude of dynamic unbalance of propeller blades.

It is well recognized that even though blades of a propeller are statically balanced, propeller blades nevertheless may be dynamically unbalanced. Dynamic unbalance of a propeller blade can be determined by rotating the blade about its longitudinal axis. If the tip of the propeller blade "runs out," i.e. describes a path which does not coincide with a cylinder having a diameter equal to the chord of the blade, the blade is dynamically unbalanced. This invention relates to the apparatus for determining the direction and magnitude of dynamic unbalance of a propeller blade. Accordingly, among our objects are the provision of apparatus for rotating a propeller blade about its longitudinal axis including means for determining the direction of dynamic unbalance; and the further provision of apparatus of the aforesaid character including means for measuring the magnitude of dynamic unbalance.

The aforementioned and other objects are accomplished in the present invention by interconnecting a shaft and a propeller blade with their axes coincident, the shaft being supported so that one end thereof is free to vibrate or "runout." Specifically, one end of the rotatable shaft is supported by a bearing assembly which prevents lateral movement thereof. Thus, the shaft is supported in a sleeve with a rubber bushing bonded to the sleeve and the shaft, the sleeve, in turn, being supported by a ball bearing assembly. The shaft is driven through the bushing by the sleeve so that the only forces transmitted to the shaft are torque forces. The root of the propeller blade is clamped to this end of the shaft by any suitable fixture. The lower end of the shaft is mounted so as to be free to move laterally, or vibrate, in a manner directly proportional to the runout of the blade caused by its unbalance. Thus, the other end of the shaft is mounted in a ball bearing assembly, the outer race of which is carried by a housing which is supported by four radially acting springs spaced 90° apart. Accordingly, the lower end of the balancer shaft is free to vibrate or runout, and lateral movements of the lower end of the shaft are transmitted to the bearing housing.

In order to measure the magnitude of vibration, or runout, imparted to the bearing housing, and, thus, determine the magnitude of propeller blade dynamic unbalance, a vibration pick-up is mounted on the bearing housing. The vibration pick-up converts mechanical energy into electrical energy, and the amplitude of the electric signal is proportional to the magnitude of propeller blade dynamic unbalance.

In order to determine the direction of dynamic unbalance, or the heavy spot on the blade, an alternating current generator is connected to and driven by the balancer shaft at a speed equal thereto. The stator of the generator is supported for rotation whereby the phase of the generator signal can be altered. The signal from the tachometer generator and the vibration pick-up are used as the input signals for an oscilloscope. The phase of the tachometer generator signal is altered by manually rotating the generator stator until the two signals are in phase. A protractor attached to the generator stator indicates the angular displacement of the stator, and the direction of dynamic unbalance can be determined by comparing the reading on the generator protractor and a second protractor attached to the balancer shaft in fixed relation to the blade. The magnitude of the dynamic unbalance can be determined directly from the oscilloscope.

Further objects and advantages of the present invention will be apparent from the following description, reference being had to the accompanying drawings wherein preferred embodiments of the present invention are clearly shown.

In the drawings:

Fig. 3 is a fragmentary sectional view taken along line 3—3 of Fig. 1 depicting the upper bearing support for the balancer shaft.

Fig. 4 is a view, partly in section and partly in elevation, depicting the lower support for the balancer shaft.

Fig. 5 is a view, partly in section and partly in elevation, depicting the tachometer generator support and drive shaft.

Figure 1:
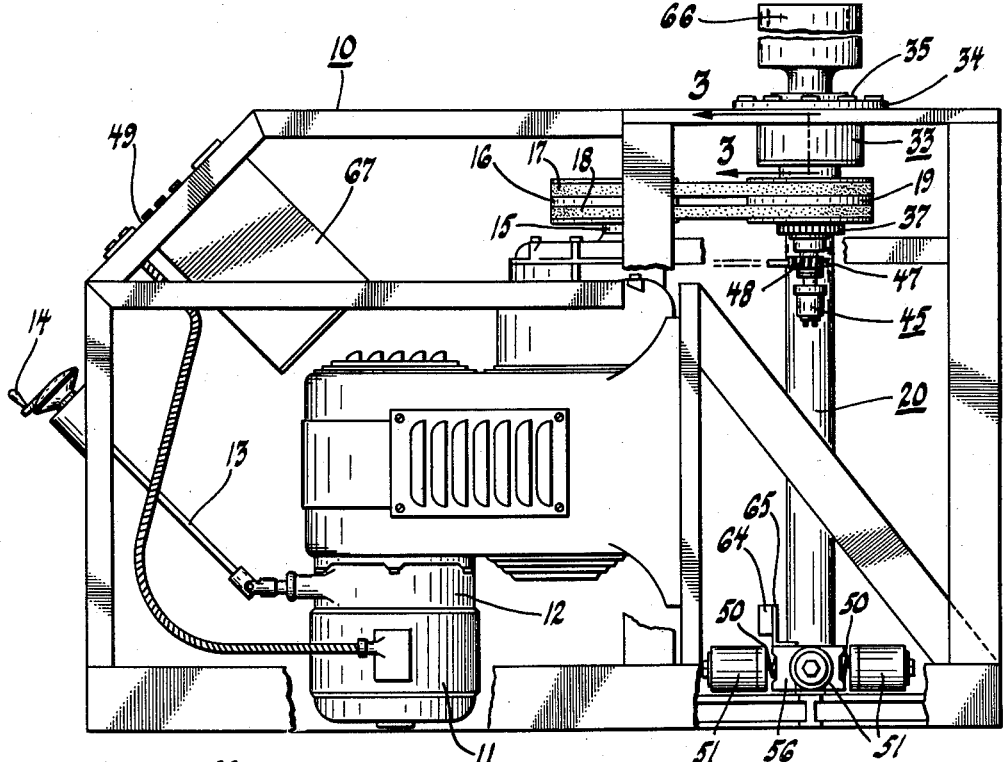
Fig. 1 is a fragmentary view, in elevation, of a dynamic unbalance testing machine constructed according to this invention.

With particular reference to Fig. 1, the testing machine includes a metal frame 10 within which a speed ranger driven by an electric motor 11 is mounted. The speed ranger has a speed range of between approximately 93 and 710 r.p.m. Any conventional speed adjusting mechanism can be connected with the motor 11, this mechanism being disposed within the housing 12 and connected by a shaft 13 to a crank 14. By rotating the crank 14, any speed within the aforesaid range can be selected. Numeral 15 designates the output shaft of the variable speed driving mechanism to which a pulley assembly 16 is attached. The pulley assembly 16 is connected by a pair of belts 17 and 18 to a pulley assembly 19 for a vertical balancer shaft 20.

With particular reference to Fig. 3, the shaft 20 is mounted adjacent its upper end so that it cannot move laterally. As seen in Fig. 3, the shaft 20 is encompassed by a driver sleeve 21, a rubber bushing 22 being interposed between the shaft and the sleeve and bonded to both the shaft and the sleeve. The elastomeric bushing permits limited lateral movement of the lower end of the shaft 20. Thus, the driving connection between the sleeve 21 and the shaft 20 is through the rubber bushing 22. The sleeve 21 is rotatably supported by a pair of ball bearing assemblies 23 and 24. The inner races 25 and 26 of the bearing assemblies are retained between a shoulder 27 on the sleeve 21, spaced apart by a bushing 28, by a nut 29 which threadedly engages the driver sleeve 21. A suitable seal 30 may be used to prevent the entrance of foreign material into the bearings. The outer races 31 and 32 of the bearing assemblies are carried by a housing 33 having a flange 34, which is connected by a plurality of bolts 35 to the frame 10.

Figure 2:
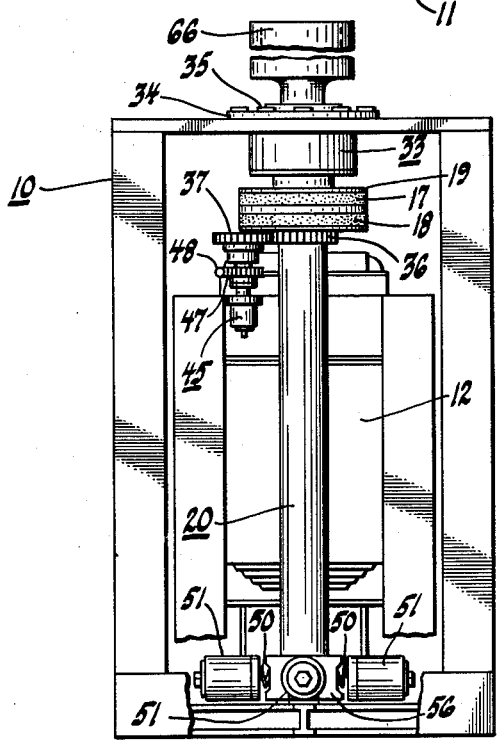
Fig. 2 is a fragmentary end view, in elevation, of the machine shown in Fig. 1.

The pulley 19 is suitably attached to the sleeve 21. In addition, the pulley 19 is connected to a gear 36 which meshes wtih a gear 37, as shown in Fig. 2. The gear 37 is connected to a shaft 38, and the ratio between gears 36 and 37 is 1:1 whereby the shaft 38 is driven at a speed equal to the speed of balancer shaft 20. The shaft 38 is supported by spaced ball bearing assemblies 39 and 40 within a sleeve 41. The sleeve 41 is supported by ball bearing assemblies 42 and 43 within a housing 44 which is suitably attached to the frame 10. The shaft 38 is connected to the rotor of a tachometer generator designated by numeral 45. The sleeve 41 is connected by bolts 46 to the stator of the tachometer generator 45. The sleeve 41 has attached thereto a worm gear 47 which may be rotated manually, as seen schematically in Fig. 8 so as to rotate the stator of the tachometer generator. The stator of the tachometer generator 45 is rotatable 360° relative to the rotor and the angular position of the stator is adjustable by means of a worm 48, as shown in Fig. 2, the worm 48 being attached to a shaft, not shown, which is connected to a suitable crank, not shown, accessible from the control panel 49 of the machine.

The lower end of the balancer shaft 20 is mounted so that it is free to vibrate, or move laterally, as shown in Fig. 4. Thus, the mount for the lower end of the shaft 20 comprises four springs 50 located 90° apart. Each spring 50 is disposed within a sleeve 51 mounted on the frame 10 and having an interiorly threaded portion 52 which receives a nut 53. The nut 53 constitutes a seat for one end of the spring 50 and by adjusting the position of the nut, the spring can be preloaded. The nut receives a threaded stud 54, which is encompassed by the spring 50 and has bonded to the end thereof a rubber buffer 55. The ends of the springs 50 engage a housing 56 which supports a ball bearing assembly 57. The outer race 58 of the ball bearing assembly is retained between a shoulder 59 on the housing 56 and a flanged retainer 60 attached to the housing 56 by screws 61. The inner race 62 of the bearing assembly 57 is retained between a shoulder on the shaft 20 and a nut 63 threadedly engaging the shaft. The rubber buffers 55 attached to the studs 54 are engageable with the housing 56 during runout thereof and act to limit lateral movement of the housing 56. The springs 50 are preloaded so that all of the springs will be in compression when the shaft runout is at its maximum, as permitted by the rubber buffers 55.

The studs 54, which carry the rubber buffers 55 are adjustable whereby the amount of runout of the lower end of the balancer shaft 20 can be varied. The bearing housing 56 has attached thereto an inertia actuated vibration pickup 64, which may comprise a coil of wire movable in a magnetic field. The vibration pickup 64 is actually carried by a bracket 65 attached to the bearing housing 56 so as to sense movement in only one plane.

The balancer shaft 20 has attached to its upper end an adapter 66 for receiving the root end of a propeller blade. Preferably the distance between the fixed point bearing mount of the shaft 20, i.e. bearing assemblies 23 and 24, and the root end of the propeller blade is equal to the distance between the horizontal propeller axis and the root end of the blade when the blade is mounted in a hub. By horizontal propeller axis is meant the axis of rotation of a propeller when it is mounted on a shaft in an aircraft. In addition, an oscilloscope 67 is mounted in the frame 10, the front thereof forming a part of the control panel 49. The oscilloscope has inputs from both the tachometer generator 45 and the vibration pickup 64 which are connected to the oscilloscope by suitable wires, not shown.

Figures 6, 7, 8:
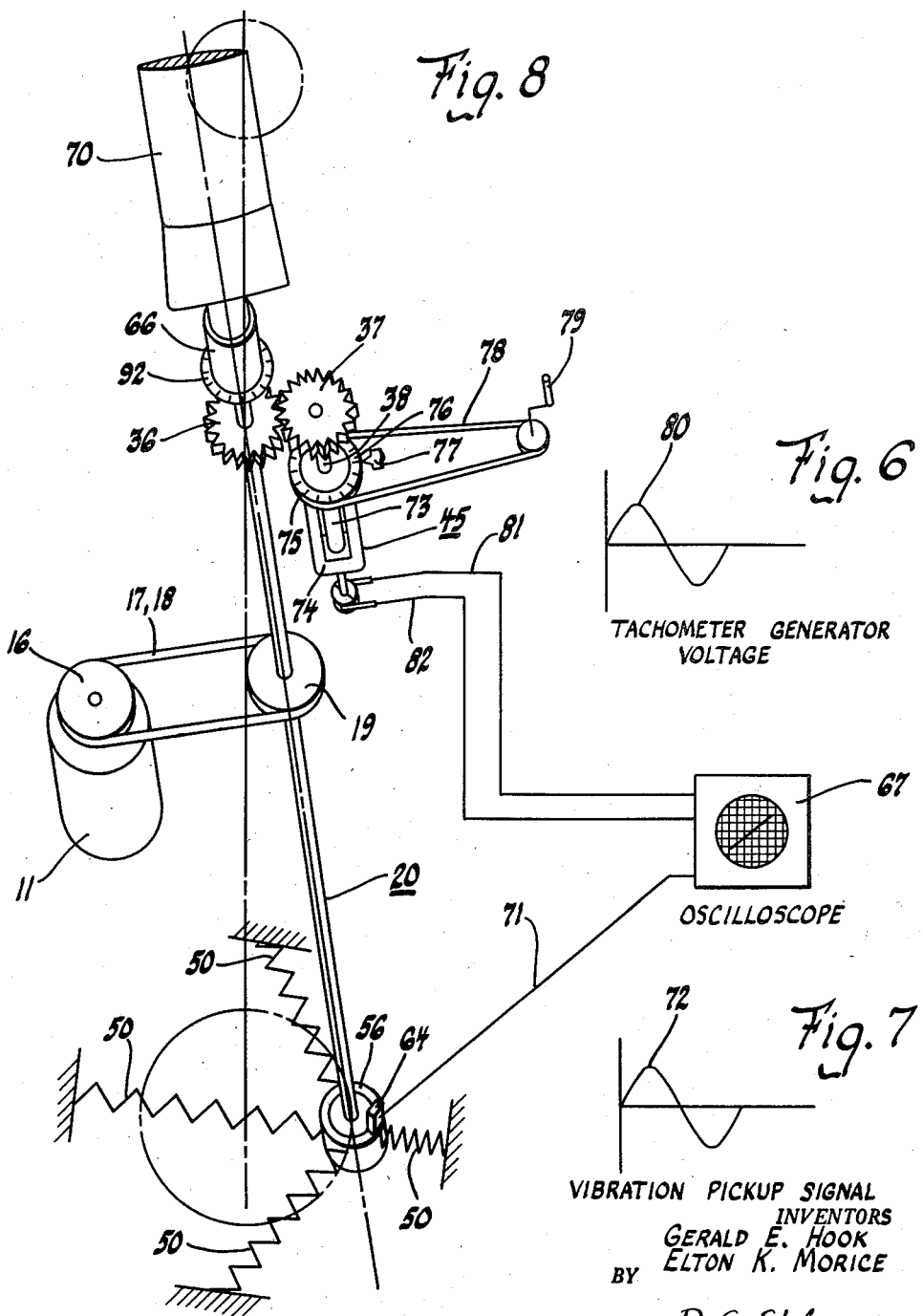
Figs. 6 and 7 are graphs representing the electrical signals produced by the tachometer generator and the vibration pickup, respectively.
Fig. 8 is a composite schematic view illustrating the method of operation of the testing machine.

With particular reference to Figs. 6 through 8, operation of the testing machine will be described. The dynamic unbalance testing machine is shown schematically in Fig. 8 from which it can be seen a propeller blade 70 is mounted in the adapter 66 attached to the upper end of the balancer shaft 2. The balancer shaft is shown schematically as being connected by means of pulley 19, belt 17, 18 to pulley 16 driven by the variable speed ranger motor 11. The lower end of the balancer shaft 20 is shown supported by the four springs 50, which engage the bearing housing 56 to which the vibration pickup 64 is attached. The vibration pickup is connected by means of a wire 71 to the horizontal amplifier input circuit of the oscilloscope 67. Since the "runout" of the lower end of the shaft 20 is always in the direction of the unbalance of the blade 70, the voltage output from the pickup will be in the form of a sine wave 72, as shown from Fig. 7. The sine wave voltage 72 produced by the pick-up 64 will be zero when the heavy spot of the blade 70 is at 90° and 270° from the pickup 64. Conversely, the sine wave 72 will peak when the heavy spot on the blade 70 is in alignment with the pickup 64 and 180° therefrom.

The adapter 66 has attached thereto a 360° protractor 92. As shown schematically in Fig. 8, the shaft 20 drives gear 36, which meshes with gear 37 attached to shaft 38, the shaft 38 being attached to rotor 73 of the tachometer generator 45. The stator 74 of the tachometer generator 45 is shown attached to a pulley 75 having a 360° protractor 76 attached thereto which co-operates with a stationary pointer 77. The pulley 75 is connected by a belt 78 to a hand crank 79. Since the tachometer generator 45 is driven by the shaft 20 at the same speed as the shaft 20, the tachometer generator 45 produces a sine wave signal 80, as shown in Fig. 6, of the same frequency as signal 72. As seen in Fig. 8, the output of the tachometer generator 45 is fed by wires 81 and 82 to the vertical amplifier input circuit of the oscilloscope 67. In order to adjust the phase of the signal produced by the tachometer generator, the stator 74 is rotated relative to the rotor 73 by the pulley 75, the belt 78 and the crank 79. When the phases of the two signal voltages are the same, the "Lissajou" pattern will be seen on the oscilloscope 67, as shown in Fig. 8. Thereafter, the protractor 76 is read, as indicated by the pointer 77, and the reading of this protractor when located on the protractor 92 will indicate the direction of the unbalance of the propeller blade. Preferably, the grid of the oscilloscope will be calibrated so that the magnitude of the unbalance can be determined directly therefrom.

From the aforegoing, it is apparent that the present invention results in a simplified dynamic unbalance testing machine for propeller blades. By using this machine, the dynamic unbalance of propeller blades can be quickly and easily determined so that propeller blades can be matched with blades having equal dynamic unbalance and mounted in a propeller hub. This can be accomplished since a propeller will be in dynamic balance if all of the blades are either in dynamic balance or equally out of dynamic balance. Moreover, if desired, propeller blade which is mounted in a machine for testing can be enclosed by a cylindrical shroud so as to minimize undesirable aerodynamic effects caused by spinning the blade about its longitudinal axis.

While the embodiments of the present invention as herein disclosed constitute preferred forms, it is to be understood that other forms might be adopted.

What is claimed is as follows:

1. Apparatus for testing propeller blades including, in combination, a vertical balancer shaft, a driver sleeve concentric with said shaft adjacent the upper end thereof, an elastomeric bushing bonded to said sleeve and said shaft and constituting the driving connection therebetween, said elastomeric bushing permitting limited lateral movement of the lower end of said shaft relative to said sleeve, bearing means rotatably supporting said sleeve, means for imparting rotation to said shaft through said driver sleeve and said elastomeric bushing, a fixture carried by the upper end of said shaft for connecting the root end of a propeller blade to the upper end of said shaft with the axes of the shaft and the blade being coincident, resilient means supporting the lower end of said shaft for limited lateral movement as caused by dynamic unbalance of said propeller blade during rotation thereof, and means responsive to lateral movement of said lower shaft end for measuring the magnitude of dynamic unbalance of said propeller blade.

2. The combination set forth in claim 1 wherein the resilient means for supporting the lower end of said shaft comprises a bearing housing circumscribing said shaft, bearing means carried by said housing and engaging the lower end of said shaft, and a plurality of circumferentially spaced cushion assemblies engaging said bearing housing and permitting limited lateral movement thereof.

3. The combination set forth in claim 2 wherein the means for measuring the magnitude of dynamic unbalance of said propeller blade comprises a vibration pickup operatively connected with said bearing housing for producing an electrical signal directly proportional to the magnitutde of lateral movement imparted to said bearing housing.

4. Apparatus for testing propeller blades including in combination, a vertical balancer shaft, bearing means rotatably supporting said balancer shaft adjacent the upper end thereof and permitting limited lateral movement of the lower end of said shaft, said bearing means including a stationary housing, a sleeve rotatably journalled in said housing and an elastomeric bushing disposed between said sleeve and said shaft, said elastomeric bushing being bonded to said sleeve and said shaft and constituting the driving connection therebetween, means attached to the upper end of said shaft for connecting the root end of the propeller blade to said upper shaft end with the axes of the shaft and the blade being coincident, an A.C. generator operatively connected to and driven by said shaft, said A.C. generator including a rotor and a stator, a first protractor rotatable with said shaft, a second protractor rotatable with the stator of said generator, means for rotating the stator of said generator to alter the phase of the signal produced thereby, resilient means supporting the lower end of the balancer shaft for limited lateral movement, means for producing a second electrical signal responsive to lateral movement of said lower shaft end, and means for comparing said signals for determining the direction and magnitude of dynamic unbalance of said propeller blade.

5. Apparatus for testing propeller blades including in combination, a vertical balancer shaft, means rotatably supporting said shaft adjacent its upper end and permitting limited lateral movement of the lower end of said shaft comprising a stationary housing, a sleeve rotatably journalled in said housing, said sleeve being concentric with but spaced from said shaft and an elastomeric bushing bonded to said shaft and said sleeve, said elastomeric bushing constituting the driving connection between said sleeve and said shaft and permitting said limited lateral movement of the lower end of said shaft, means for rotating said shaft, a fixture carried by the upper end of said shaft for connecting the root end of a propeller blade to the upper end of said shaft with the axes of said shaft and blade being coincident, resilient means supporting the lower end of said shaft for limiting lateral movement as caused by dynamic unbalance of said propeller blade during rotation thereof, said resilient means comprising a bearing housing circumscribing the lower end of said shaft, bearing means carried by said housing for rotatably supporting the shaft therein and a plurality of circumferentially spaced cushion assemblies supporting said bearing housing and permitting limited lateral movement thereof, each cushion assembly comprising a stationary sleeve having a spring and a buffer coaxially mounted therein, and means carried by said bearing housing and responsive to lateral movement of the lower end of said shaft for detecting the magnitude of dynamic unbalance of said propeller blade.

References Cited in the file of this patent

UNITED STATES PATENTS

| 728,315 | Snell | May 19, 1903 |
| 2,341,141 | Greenleaf et al. | Feb. 8, 1944 |
| 2,363,373 | Werner | Nov. 21, 1944 |
| 2,420,765 | Annis | May 20, 1947 |
| 2,722,828 | Holaday et al. | Nov. 8, 1955 |

FOREIGN PATENTS

| 595,906 | Great Britain | Dec. 23, 1947 |